Dec. 29, 1953

L. E. HECKATHORN 2,664,039

VARIABLE TREAD EARTHWORKING IMPLEMENT
WITH FRAME LEVELING MEANS

Filed Dec. 29, 1947

INVENTOR:
LOYD E. HECKATHORN
BY HIS ATTORNEY
HARRIS, KIECH, FOSTER & HARRIS,
BY
Ward D. Foster

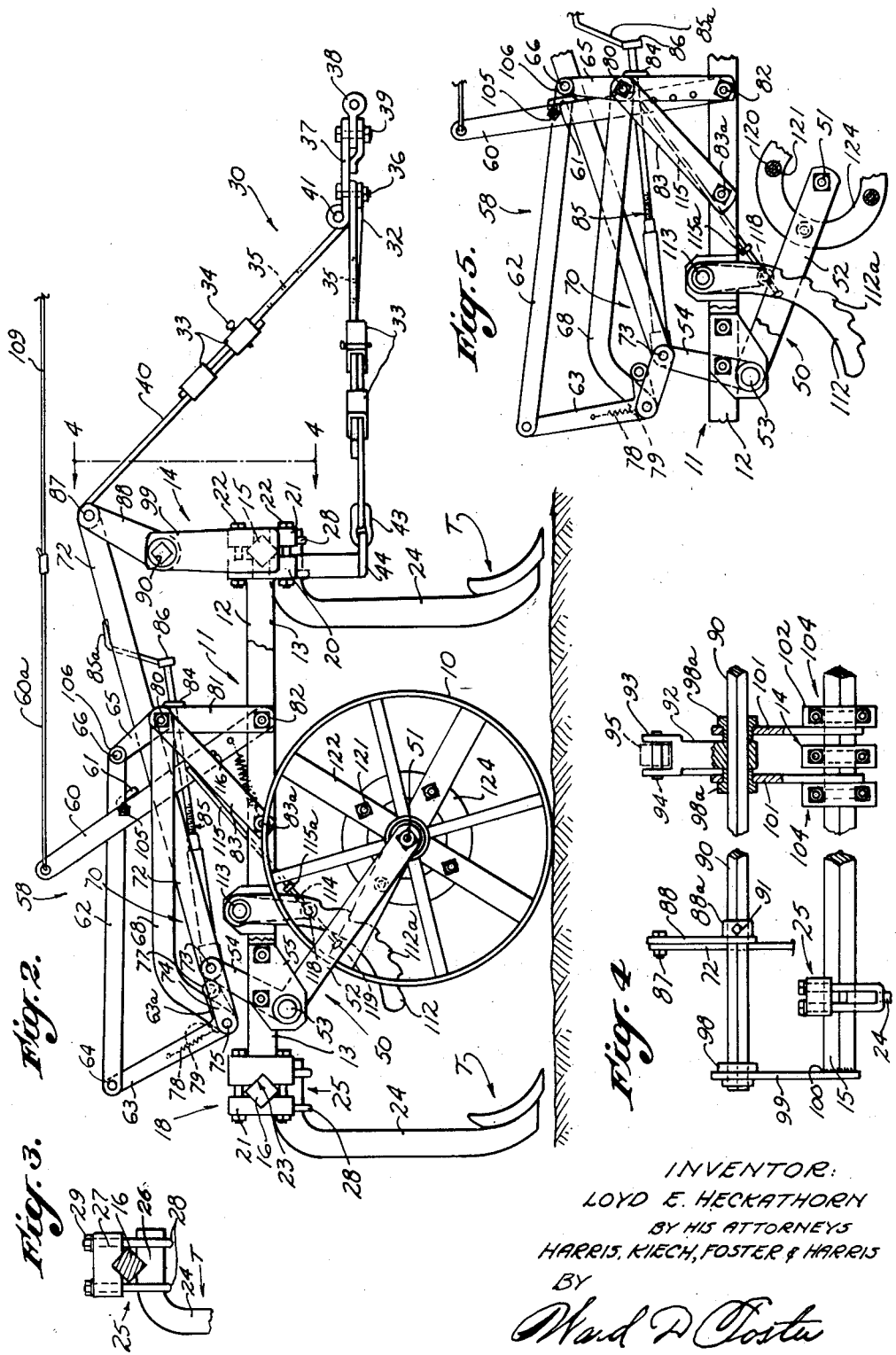

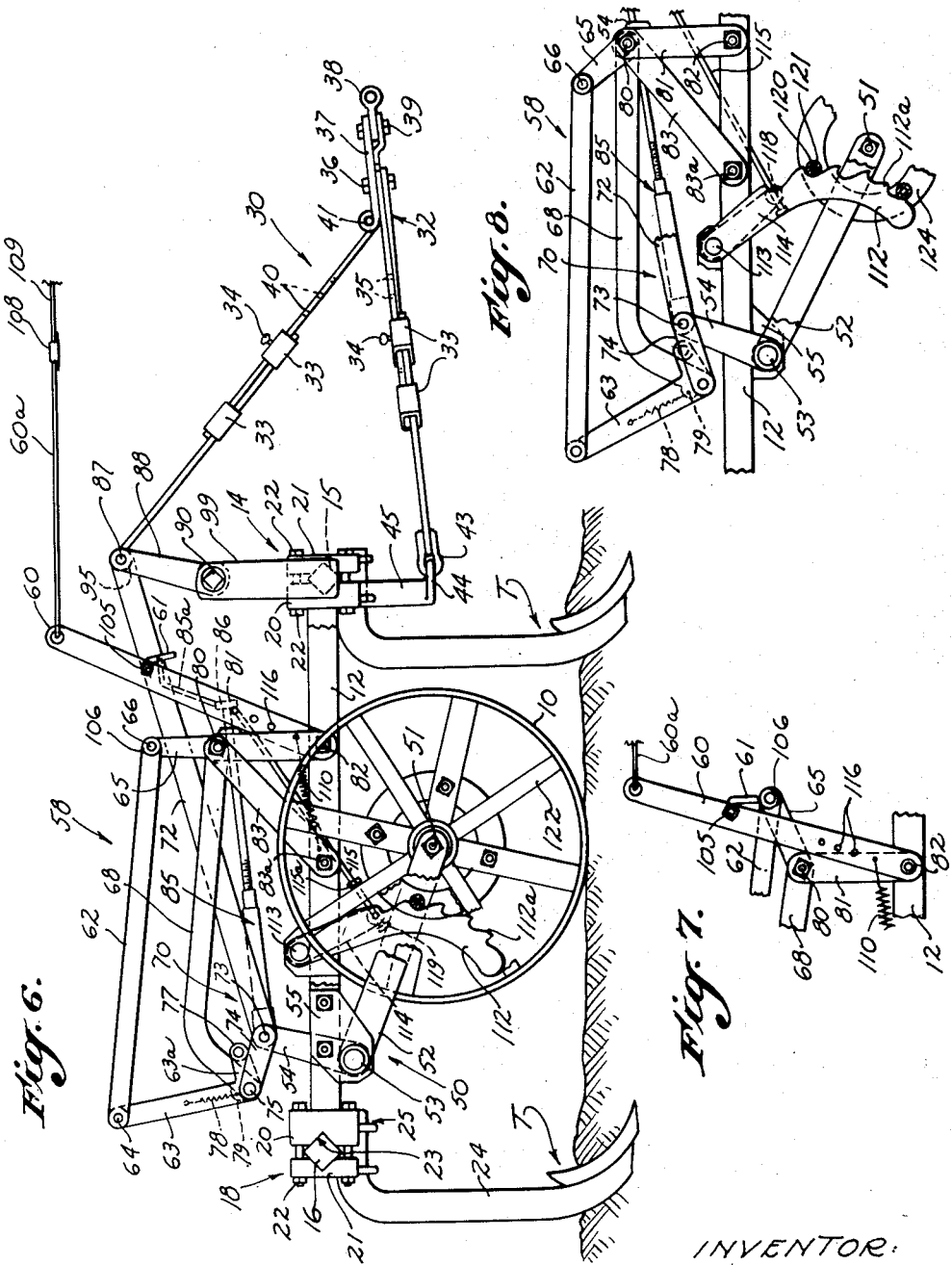

Patented Dec. 29, 1953

2,664,039

UNITED STATES PATENT OFFICE 2,664,039

VARIABLE TREAD EARTHWORKING IMPLEMENT WITH FRAME LEVELING MEANS

Loyd E. Heckathorn, Garden Grove, Calif., assignor to Towner Manufacturing Co., Santa Ana, Calif., a partnership Application December 29, 1947, Serial No. 794,405

5 Claims. (Cl. 97—46.17)

This invention relates to carriage structures and control mechanisms for earthworking implements supported upon ground wheels, more particularly two wheeled implements, wherein the carriage structure is adapted to be raised and lowered to accommdate the implements in earthworking positions and in elevated or transport positions.

Various types of structures have been employed which comprise wheeled frames carrying earthworking tools, such as plows, cultivators and subsoilers, in which the tools are adapted to be lifted and raised as required through the medium of raising and lowering the frames or carriage structures upon which they are mounted.

It is one object of the present invention to provide means for varying the spread of the wheels at the opposite sides of the implement whereby to position the wheels for accommodating any spacing of rows that the farmer may desire, it being more particularly an object to have such tread of the wheels universally variable, rather than to provide only for a limited number of predetermined adjustments.

It is also an object of the invention to provide a frame or carriage structure specifically adapted to quick and easy adjustment to any desired position of the wheels. The invention also has for an object a means for carrying and mounting a multiplicity of earthworking tools, so that they may be adjusted universally, and may lie beyond the wheels if desired, and therefore may be accommodated to any spacing of rows of plants that may be encountered in tilling the soil or that may be required in preparing the soil for various crops or for other purposes.

Another object of the invention is to provide, especially in a two-wheeled structure, a frame or carriage particularly adapted for the mounting of a series of forward earthworking tools as well as a series of rearward earthworking tools.

A further object of the invention is to provide means for automatically controlling the elevations of forward and rearward series of earthworking tools so that they may be also maintained at an even level both when in earthworking positions and when in elevated positions, this object being especially pertinent to two wheeled structures upon which the tools are balanced when the implement is attached to a tractive vehicle.

A particular object is to employ features of the above indicated nature in earthworking implements wherein the tools are automatically lowered to earthworking positions and automatically raised from such positions by movement of the implement.

Other objects of the invention and various features thereof will become apparent upon reference to the following specification and the accompanying drawings wherein certain embodiments of the invention are shown by way of illustration.

In the drawings:

Fig. 2 is principally a side elevation of the structure of Fig. 1, except that the control parts are in a rearward position rather than the forward position of Fig. 6, certain portions being broken away to facilitate disclosure, and the framework being shown in elevated position with the earthworking tools held in inoperative relationship above the surface of the ground;

Fig. 3 is an elevational detail showing a clamp means for mounting the earthworking tools upon the frame or carriage structure of the implement;

Fig. 4 is a fragmentary front elevation taken approximately from the line 4—4 of Fig. 2;

Fig. 5 is an elevation of a portion of the structure of Fig. 2 showing the relationship of most of the control parts, including an actuating lever, immediately following the dropping of the frame or carriage structure from the position of Fig. 2 to an earthworking position somewhat as seen in Fig. 6;

Fig. 6 is a view similar to that of Figs. 2 and 5, the tools being in earthworking position, and parts being shown in their relationship preparatory to elevating the frame and tools from earthworking position by forward movement of the ground wheels;

Fig. 7 is a fragmentary view illustrating the actuating lever in its movement from the position of Fig. 5 to the position of Fig. 6; and Fig. 8 is a fragmentary view similar in some respects to that of Fig. 6 and showing the relationship of the parts as the frame or carriage structure is elevated into the inoperative position of Fig. 2.

Figure 1:
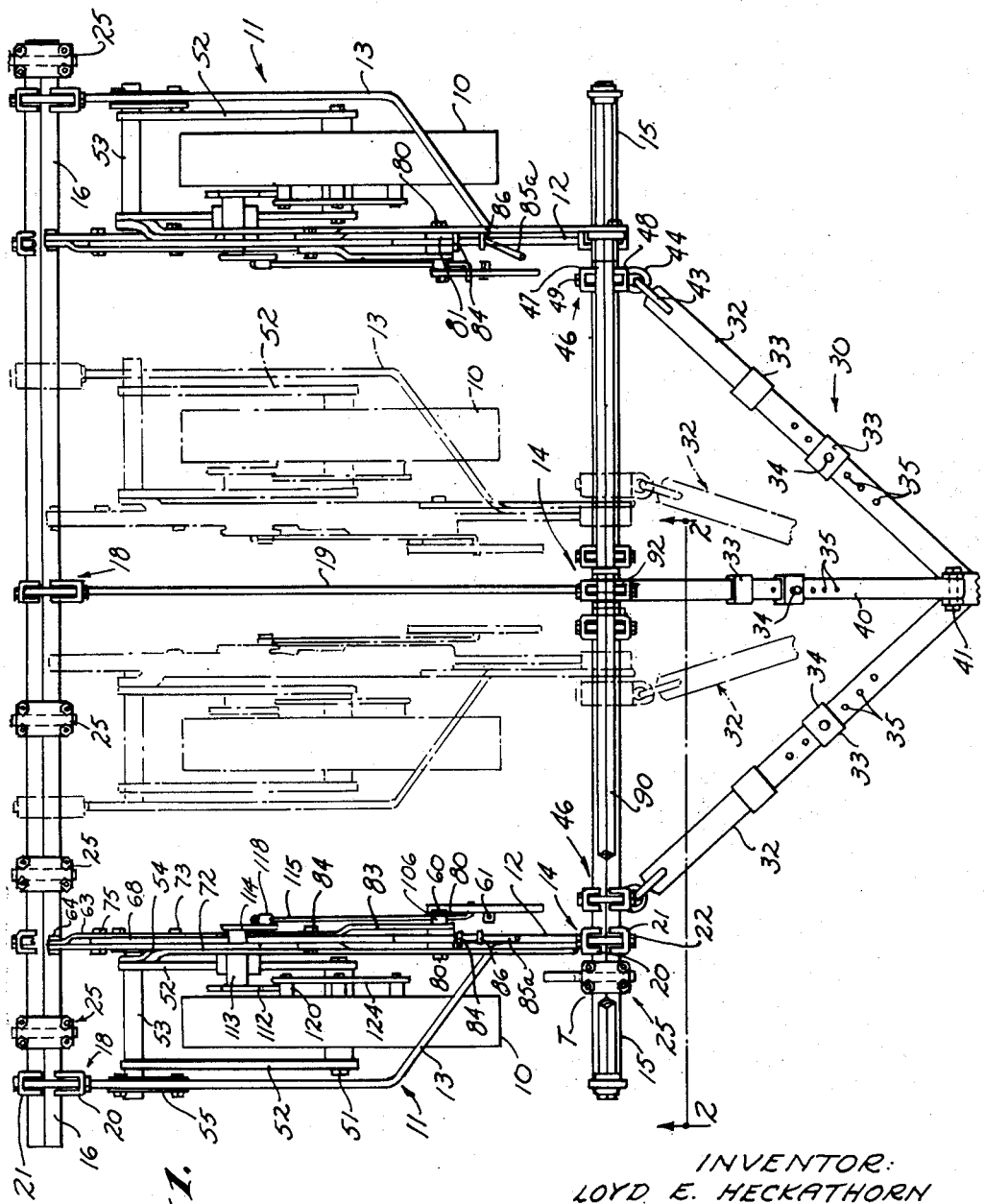
Fig. 1 is in general a plan view of an earthworking implement possessing the various features of this invention, the universal adjustment of the ground wheels being indicated by broken lines and the parts in general being in the position of Fig. 6.

The structure illustrated comprises ground wheels 10 and a pair of transversely spaced wheel frames 11, each of the frames 11 comprising a longitudinally extending bar 12 at one side of the respective wheel and a bar 13 spaced from the bar 12 at the outer side of the respective wheel 10 except that the forward portion of the bar 13 converges inwardly and joins the forward end of the bar 12. The forward ends of the bars 12 and 13, in each instance, are adjustably mounted by a clamp 14 slidable upon a transversely extending forward square beam 15, the rearward ends of the bars 12 and 13 being adjustably mounted upon a rearward square beam 16 by means of slidable clamps 18. Preferably, a middle bar 19 extends longitudinally of the implement, its forward end being connected to the beam 15 by another clamp 14, and its rearward end being connected to the rearward beam 16 by another clamp 18. The clamps 14 and 18 are of approximately identical construction, and each comprises a main clamp jaw 20 to which the respective end or ends of the bars 12, 13 and 19 are welded, and a separable clamp jaw 21, the jaws 20 and 21 being adapted to be bound together upon the square beams 15 and 16 by means of tie bolts 22. It will be observed (Figs. 2 and 6) that the square beams 15 and 16 are positioned with one diagonal disposed vertically, and proper clamping engagement of the jaws 20 and 21 with these beams 15 and 16 is effected through the medium of right angle notches 23 in the jaws 20 and 21. Thus, when the tie bolts 22 are loosened, the clamps 14 and 18 may be shifted along the beams 15 and 16 universally to any desired position of adjustment, in which position the clamps may be secured by tightening the tie bolts 22. As best seen in Fig. 1, each of the jaws 20 and 21 is in the form of a U, the ends of the bars 12, 13 and 19 being welded to the bends of the respective U's 20, and the elongated sides of the U's having the right angle notches 23.

Each of the square beams 15 and 16 adapted to support a multiplicity of earthworking tools T, each of which is shown as comprising a standard 24 whose upper end is mounted on the respective square beam by means of a universally adjustable clamp 25, which in many respects is similar to the clamps 14 and 18, as best indicated in Fig. 3. Here, a lower jaw 26 of the clamp may be made integral with the standard 24, and a separable upper jaw 27 of the clamp bound to the lower jaw 26 by means of U bolts 28 and cross tie bars 29. By these clamps 25 each of a multiplicity of tools T may be universally adjusted along the square beams 15 and 16 and retained in adjusted position through the medium of the U bolts 28, and end tools may be disposed beyond the wheels 10 as indicated in Fig. 1 on one end of the square beam 16.

The implement is adapted to be drawn forward through the medium of a draft tongue generally indicated at 30, this tongue comprising two angularly disposed draft bars 32, each bar 32 being formed of two adjustably connected parts, the adjacent ends of the respective parts being provided with rigidly attached slide loops 33 respectively embracing the adjacent end portions of the other bar parts, and being adapted to be held in adjusted relationship, in each instance, by means of a locking pin 34 which projects through apertures in one of the slide loops 33 and selectively through one of a plurality of openings 35 in the other bar parts. The forward end of each of the adjustable bars 32 is pivotally connected by a pivot bolt 36 with a short tongue bar 37 whose forward end is bifurcated as shown and carries a short clevis or swinging eye 38 mounted as by a pivot bolt 39. The eye 38 is adapted for attachment to a tractive vehicle for vertical swinging of the draft tongue 30 and transverse swinging of the implement as a whole when turning. The rearward end of the short tongue bar 37 is connected to an adjustable bracing and positioning arm 40, similar to each of the bars 32, through the medium of a transverse hinge 41, for a purpose later to be explained. The rearward end of each adjustable bar 32 is adjustably connected with the forward square beam 15. In the form shown, this is accomplished by means of an eye 43 welded to the rearward end of the respective bar 32 and engaged in an eye 44 fixed to the lower end of a depending bracket 45 which is mounted on the square beam 15 by means of a clamp 46 (Fig. 1) of the same construction as the clamps 14 and 18, and comprising a main clamp jaw 47 and a separable clamp jaw 48 adapted to be bound together by tie bolts 49. In the form illustrated, the upper end of each bracket 45 is welded to a lower portion of the respective main clamp jaw 47.

In order that the carriage structure or frame, which is constituted by the wheel frames 11 and the transverse square beams 15 and 16 upon which the wheel frames 11 are mounted, may be properly raised and lowered for the purpose of withdrawing the earthworking tools T from the earth and returning them to earthworking position, each wheel 10 is mounted upon a bell crank assembly 50 (Figs. 2 and 6) of the crank axle type. Each assembly 50 comprises an axle 51 upon which the respective wheel 10 is directly journalled, and each axle 51 is carried between spaced supporting crank arms 52 which are secured, as by welding or the like, to a transverse crank shaft 53 to which in turn is fixedly secured, as by welding or the like, a single, upstanding actuating arm 54. The crank shaft 53 for each wheel 10 is journalled upon the bars 12 and 13 of the respective frame 11 in any appropriate manner, as by being mounted in bearing brackets 55 bolted to the respective bars 12 and 13.

Each wheel frame 11 is provided with a control mechanism 58 for its crank assembly 50. This mechanism is, in each instance, comprised of an actuating lever 60 controlled by a cable 60a and carrying a swinging dog 61, a connecting bar 62 which constitutes a draw bar, a bell crank 63 which constitutes a trip device and to one end of which the connecting bar 62 is pivotally attached as by a pivot bolt 64, a swinging arm 65 to which the other end of the connecting bar 62 is pivotally connected as by a pivot pin 66, an offset anchor bar or anchor beam 68, and a jointed linkage 70 which comprises the adjustable arm 40 and a longitudinally disposed movement-limiting and positioning arm 72 whose rearward end is connected by a pivot bolt or pivot pin 73 to the upper end of the crank arm 54 and also to the forward end of a bracing link 74 which is part of the linkage 70 and has its rearward end pivotally connected by a pivot bolt or a pivot pin 75 with the rearward end of the offset anchor beam 68, the pivot pin 75 also serving as a bearing for the bell crank 63. The bell crank 63 is provided with a lower, forwardly extending arm 63a disposed along the rearward portion of the anchor beam 68 and carrying a roller 77 adapted to be forced against the upper end of the crank arm 54 to dislodge the latter and the bracing link 74 from their positions shown in Fig. 2, where the earthworking tools T are held in inoperative position, such dislodgement being effected when the bell crank 63 is actuated by forward movement of the connecting draw bar 62 so that the tools T may descend to the earth. Otherwise, the crank arm 63a is held in a position as illustrated in Fig. 6 by a spring 78 whose upper end is connected to the crank 63 and whose lower end is attached to a rearwardly extending boss 79 on the rearwardmost portion of the anchor beam 68.

The forward end of each anchor beam 68 is pivotally mounted upon a bolt 80 carried in the upper end of an upstanding mounting 81 whose lower end is fixed upon the respective longitudinal frame bar 12 by a bolt 82, the mounting 81 being braced by a brace arm 83 whose upper end is mounted upon the bolt 80 and whose lower end is secured to the bar 12 by a bolt 83a. The bolt 82 also serves as a pivotal mounting of the lever 60. The upper portion of each upstanding mounting 81 carries on its forward side a stop block 84 through which the forward end of a corresponding jack screw 85 slidably passes. In each instance the jack screw 85 which comprises the usual, long, internally threaded socket member and externally threaded screw shaft has the rear end of its socket member pivoted upon the pivot pin 73, while the forward end of the screw shaft carries a head 86 fixed thereon and adapted to abut against the stop block 84, and also having a crank 85a to adjust the effective length of the jack screw 85. When the parts are in their elevated position of Fig. 2 and the head 86 is turned up tight against the block 84, the parts are locked, and the tools and frames cannot be lowered. When the jack shaft is extended somewhat, it permits corresponding drop of the tools until the head 86 strikes the stop 84, whereupon further movement of the bell crank arm 54 ceases.

The forward end of each positioning and movement-limiting arm 72 is pivotally connected with the previously mentioned adjustable bracing arm 40 through the medium of a pivot bolt 87 which connects the arm 72 to a rock arm 88 slidable along but normally bound upon a transverse square rock shaft 90 through the medium of a hub 88a having a square hole receiving the shaft 90 and provided with a set screw 91. The middle of the square shaft 90 carries an upstanding rock arm 92 also having a square hole and slidable along the square shaft 90, the upper end of the arm 92 being provided with spaced ears which carry a hinge pin 94 received in an eye 95 upon the upper end of the bracing arm 40. The square rock shaft 90 is mounted by having its ends fixed in collared bushings 98 rotatably carried in the upper end of fixed arms 99 rigidly secured, as by welding 100 to the end portions of the forward transverse square beam 15. The middle portion of the square rock shaft 90 also is positioned with respect to the square beam 15 by means of other collared bushings 98a, like the bushings 98, mounted upon the shaft 90 and rotatably secured in the upper ends of rigid arms 101, each of whose lower ends is adjustably clamped to the square beam 15 by being secured as by welding to one member 102 of an adjustable clamp 104 of the same construction as the adjustable clamps 14 previously described.

From the foregoing, it will be apparent that each rock arm 88 rocks with the square rock shaft 90 which is held in a fixed position above the forward square beam 15, such rocking being effected in conjunction with the operation of the draft tongue 30 and the movement limiting arm 72, as will be described.

As previously indicated, the raising and lowering of the carriage structure comprised of the wheel frames 11 and the forward and rearward square beams 15 and 16 is effected through the actuating levers 60 by way of the previously mentioned cables 60a, and the leveling of the forward and rearward earthworking tools T is maintained through the linkages 70 which are comprised of the positioning and movement-limiting arms 72, the bracing links 74 and the adjustable positioning arm 40. When the carriage structure and tools are in the elevated position illustrated in Fig. 2, the pivot pin 73, which, in each instance, connects the movement-limiting arm 72 and the bracing link 74 with the upstanding crank actuating arm 54, is positioned above the dead center line of the pivot pin 75 and the pivot bolt 87. Each bracing link 74 serves to maintain such elevated position of the respective pivot pin 73, and the weight of the carriage structure placed upon the respective wheel 10 through the respective bell crank assembly 50 insures maintenance of this relationship by action of the crank arm 54.

In order to drop the carriage structure and the tools T into the earthworking position of Fig. 6, it is necessary to place draft upon each draw bar 62 to pull forward the upper portion of the bell crank 63 so that the roller 77 on the forward extremity of the arm 63a of the bell crank may press upon the back of the upstanding arm 54 and thereby dislodge the pivot pin 73 from its elevated position to a point below the center line of the pivot pin 75 and the pivot bolt 87 whereby the carriage structure and the tools T may drop to a position such as indicated in Fig. 6. Such required movement of the draw bar 62 is accomplished through the medium of the swinging dog 61 on the actuating lever 60 when the latter is drawn forward by the cable 60a. For this purpose each swinging dog 61, which is pivoted upon one side of the respective lever 60 by a pivot bolt 105, extends laterally in one direction so that it will be brought into engagement, during travel through its arcuate path, with a laterally projecting stud, or, as illustrated, a roller 106 disposed upon a projecting end portion of the respective pivot pin 66 at the forward end of the respective draw bar 62. The opposite edge of each swinging dog 61 projects so that it will overlie the forward edge of the respective actuating lever 60 and thus come into contact with such forward edge which thereby acts as a stop. This general relationship is shown in Fig. 5. The parts having been advanced sufficiently to shift the off center pivot pin 73 so that the carriage structure drops, each bell crank assembly 50 assumes the relationship shown and the rearward portions of the draw bar 62 and the anchor beam 68 are correspondingly elevated with respect to the respective wheel frame 11. Continued movement of each actuating lever 60 causes the swinging dog 61 to clear the roller 106 as indicated in Fig. 7. Clearance having been effected, the spring 78 on the respective bell crank 63 operates to return the respective draw bar 62 and bell crank 63 to their relatively inoperative positions somewhat as indicated in Fig. 6. In order that the actuating lever 60 may be operated in unison from the driver's seat on a tractive vehicle to which the implement is attached by the swinging clevis or eye 38 at the forward end of the draft tongue 30, the draft cables 60a are joined, as by a clamp 108 to a single cable 109 which leads to the driver's station. When the driver releases the cable 109, the two actuating levers 60 are respectively returned to their initial positions, as seen in Fig. 2 by means of springs 110 connecting the levers 60 and the frame bars 12.

For the purpose of lifting the carriage structure and the earthworking tools T from the operative position shown in Fig. 6 to the inoperative or transport position shown in Fig. 2, the actuating levers 60 are again relied upon. This result is accomplished by means of a ratchet-like cockscomb 112 for each wheel 10, each cockscomb 112 being a part of a bell crank pivoted on the respective frame bar 12 as indicated at 113, this bell crank including a depending bell crank arm 114. A pull rod 115 connects the respective bell crank arm 114 with the respective actuating lever 60, its forward end being mounted in any one of a series of apertures 116, and its rearward end sliding through a mounting 118 (Fig. 8) rotatably carried in the lower free end of the bell crank arm 114. By reason of this sliding mounting, initial forward actuation of the respective lever 60, to effect release of the carriage structure so that it may drop to lower the tools T to earthworking position, takes place without moving the respective cockscomb 112 from the position illustrated in Figs. 2 and 5. However, when it is desired to elevate the carriage structure and the tools T, actuation of the levers 60 forward to a point beyond that necessary to release the carriage structure brings nuts 119 on the rearward ends of the pull rods 115 into engagement with the mountings 118 and thereby then serves to pull the cockscombs 112 forward from the position of Figs. 2 and 5 to the position of Figs. 6 and 8, whereupon ratchet-like teeth 112a on the cockscombs 112 are brought into driving engagement with short spacer sleeves 120 carried on bolts 121 secured to the spokes 122 of the wheels 10 and to retaining rings 124 held in place on the spokes by the bolts 121.

The cockscombs 112 having been brought into proper driving engagement with the sleeves 120 on the wheels 10, through actuation of the levers 60 by the cables 60a and 109, forward draft of the implement by the tractive vehicle to which it is attached causes the cockscombs 112 to be elevated by rotation of the wheels 10 through the agency of the ratchet teeth 112a. As a consequence of the elevation of the cockscombs 112, the wheel frames 11 and the square beams 15 and 16 are elevated thereby also elevating the tools T. When such elevation has been effected, the anchoring parts for each wheel 10, including the anchor beam 60, the bracing link 74 and the pivot pin 73, are returned to their original position, as best indicated in Fig. 8. At this stage, release of the cable 109 permits the springs 110 to become operative and return the corresponding parts to the initial position illustrated in Fig. 2, the hinged dogs 61 overriding the respective rollers 106 as the levers 60 pass to such initial position. The springs 78 will have effected return of the draw bar 62 and the bell crank trips 63 to their initial positions with respect to the anchor beams 68. Under these conditions the cockscombs 112 will be readily released from the sleeves 120 on the wheels 10, and the cockscombs will move back into their disengaged position by gravity or through any other appropriate agency, such as collars 115a carried upon the pull rods 115 at points in advance of the crank arms 114. By shortening the jack screws 85 so that their heads 86 bind on the stops 84, the parts may be locked in elevated position.

*Operation*

In general, the various functions of the present structure and its operation have been outlined above. To recapitulate, the transverse, square beams 15 and 16 serve as forward and rearward frame members upon which the two wheel frames 11 are adjustably mounted for lateral adjustment by means of the clamps 14 and 18 which are slidable along the beams 15 and 16 when the bolts 22 are loosened and are bound in desired position by tightening the bolts 22. In this manner any suitable tread or wheel spacing between the wheels 10 may be accomplished. Similarly, each of the multiplicity of tools T is laterally adjusted along the respective beam 15 or 16 through the medium of its clamp 25 which is best shown in Fig. 3. Thus, a great variety of earthworking tools may be employed and disposed according to any spacing arrangement required for the working of any desired arrangement of rows or of plant spacing. Also, this construction conveniently provides for the employment of a forward series of earthworking tools on the forward beam 15 as well as for the usual rearward series of earthworking tools such as those carried by the rearward beam 16.

When the implement has been brought onto a field to be worked, and it is desired to drop the tools T from the transport or inoperative position of Fig. 2 to the earthworking position of Fig. 6, the jack screw 85 is let out to the desired extent, and the driver of the tractive vehicle pulls the cable 109, thereby placing forward draft upon the forking cables 60a and pulling forward both of the actuating levers 60. As previously described, the swinging dogs 61 on the levers 60 move into engagement with the rollers 106 at the forward ends of the draw bars 62 so that continued forward movement of the levers 60, working through the draw bars 62, rocks the bell crank trips 63 about the pivot pins 75 on the rearward ends of the anchor beams 68 so that the rollers 77 at the extremities of the bell crank arms 63a press against the rearward edges of the upstanding crank arms 54 and dislodge the off center pivot pins 73, which connect the bracing links 74 with the movement-limiting arms 72. The pins 73 thus are forced downward through dead center so that the links 74 no longer brace the parts in elevated position and permit the carriage structure including the wheel frames 11 to descend until the tools T penetrate the earth. Descent continues until the jack screw heads 86 strike the stops 84, thus limiting further movement of the bell crank arms 54 and consequent movement of the arms 52. As seen in Fig. 6, somewhat further descent will occur before the head 86 shown will strike the stop 84.

Cultivation or any other earthworking process then occurs upon forward draft of the implement by the vehicle to which it is attached by way of the clevis or swinging eye 38 at the forward end of the draft tongue 30. Elevation of the carriage structure and the earthworking tools T from the earthworking position of Fig. 6, and the restoration of the control mechanism to initial position from the position of Fig. 5, are effected by moving the actuating levers forward again until the pull rods 115 move the cockscombs 112 from the position of Figs. 2 and 5 to the position such as illustrated in Fig. 6, whereupon movement of the implement forward causes the sleeves 120 carried by the bolts 121 on the wheels 10 to engage the ratchet teeth 112a and raise the cockscombs 112 from the position of Fig. 6 into the position of Fig. 8 so that the anchoring linkages provided by the anchor beams 68, the bracing links 74 and the movement-limiting arms 72 are restored to their initial positions as illustrated in Figs. 2 and 8.

In order that the forward earthworking tools T may be maintained at an even level with the rearward earthworking tools T, which condition of a necessity requires a constant relationship between the forward square beam 15 and the rearward square beam 16, the movement-limiting arms 72 and the forward bracing and positioning arm 40 of the draft tongue 30 are employed. Since the swinging eye 38 attaches the forward end of the draft tongue 30 to the tractive vehicle at a constant height, it is apparent that if an unyielding tongue were employed the wheel frames 11 would rock from front to rear and correspondingly shift the square beams 15 and 16 as the tools T are raised and lowered. Also, if a tongue structure were used which was flexibly connected with the carriage structure such rocking would be relatively uncontrolled. To overcome these difficulties and maintain the forward and rearward series of tools at an even level, the tongue bars 32 are pivotally connected by the eye connections 43, 44 to the front square beam 15, and a sort of stiff-knee structure is provided to connect the forward portion of the draft tongue 30 with the control linkages 70 so as to control the position of the upper ends of the upstanding crank actuating arms 54 with respect to the forward end of the draft tongue 30. The required stiff-knee action is effected by the accurate positioning of the pivot bolts 87 at the forward ends of the movement-limiting arms 72, these arms also constituting leveler arms, and this positioning is accomplished by the mounting of the pivot bolts 87 upon the upper ends of the rock arms 88 whose lower ends are retained in fixed positions by means of the square rock shaft 90 which in turn is held in fixed position in the upper ends of the fixed arms 99 and 101 which are rigidly held on the forward square beam 15. As a consequence of this construction, as the carriage structure and the tools T drop from an initial level relationship, as seen in Fig. 2, and the tongue bars 32 and their attaching eye 38 swing downward with respect to the vehicle and their rearward ends hinge with respect to the carriage structure by reason of the eyes 43, 44 the upper end of the bracing and positioning arm 40 necessarily moves somewhat rearward in conjunction with a corresponding movement of the movement-limiting arms 72. Not only are the movement-limiting arms 72 caused to move in conformity with the movement of the upper end of the bracing and positioning arm 40, but such movement of the arms 72 is limited by the corresponding movement of the positioning arm 40. This control of course takes place through the medium of the square rock shaft 90 and the rock arms 88 and 92 (Fig. 4) upstanding therefrom.

Thus, the greater the downward movement of the earthworking tools T and the greater the downward swinging movement of the tongue arms 32, the greater will be the rearward movement of the upper end of the bracing and positioning arm 40 and consequently the greater will be the relative permitted rearward movement of the movement-limiting arms 72 and the pivot pins 73 and the upper ends of the upstanding crank arms 54 of the bell crank assemblies 50. The limit of this movement is gauged by the depth control devices, the movement ceasing when the heads 86 strike the stops 84. Since the spacing of the pivot bolts 87 and the pivot pin 94 (Fig. 4) with respect to the forward square beam 15 is maintained substantially constant by reason of the upstanding fixed arms 99, 101 and the upstanding rock arms 88, 92, the vertical movements of the forward and rearward square beams 15 and 16 and their earthworking tools T are equal, regardless of the amount of drop of these members with respect to the point of attachment of the tongue mounting eye 38 upon the tractive vehicle.

In order to obtain a proper positioning of the movement-limiting arms 72 and of the positioning and bracing arm 40, the adjustment means provided by the slide loops 33, the apertures 35, and the locking pins 34 may be relied upon. Similarly, corresponding adjustment of the tongue arms 32 may be effected, if necessary, when the two wheel frames 11 are adjusted along the forward square beam 15, whereby to insure proper length of these arms with relation to the particular setting of the bracing and positioning arm 40.

Since modifications of the generic aspects of the invention herein disclosed will become apparent to those skilled in this art, it is intended to cover all modifications falling within the scope of the claims.

I claim as my invention:

1. In combination in an earthworking implement: a pair of transversely spaced ground wheels; a transverse frame structure mounted on said wheels about a transverse axis provided by said wheels, said frame structure comprising a transverse rearward beam and a transverse forward beam; pivoted means operatively connected with said wheels and carried by said frame structure for automatically raising and lowering the same with respect to said wheels; two series of earthworking tools spaced respectively along said beams; a stiff draft tongue pivotally connected with said forward beam and adapted to be attached to a tractive vehicle; and leveling means attached to said raising and lowering means and to said draft tongue for automatically maintaining the forward series of tools in a given even relationship with respect to each other horizontally when in lowered positions and when in raised positions, said leveling means comprising a jointed linkage having one portion pivotally attached to said draft tongue and another portion pivotally attached to said raising and lowering means, and means to position the joint of said linkage, said jointed linkage including a leveler arm and a bracing arm for limiting movement of said raising and lowering means, and said raising and lowering means including a bell crank carrying a wheel, an anchor beam and a swinging bracing link pivoted on said anchor beam, one end of said leveler arm being pivotally connected to said bracing link and to said bell crank to control the relative position of said wheel.

2. In combination in an earthworking implement: a pair of transversely spaced ground wheels; a transverse frame structure mounted on said wheels about a transverse axis provided by said wheels, said frame structure comprising a transverse rearward beam and a transverse forward beam; pivoted means operatively connected with said wheels and carried by said frame structure for automatically raising and lowering the same with respect to said wheels; two series of earthworking tools spaced respectively along said beams; a stiff draft tongue pivotally connected with said forward beam and adapted to be attached to a tractive vehicle; and leveling means attached to said raising and lowering means and to said draft tongue for automatically maintaining the forward series of tools in a given even relationship with respect to each other horizontally when in lowered positions and when in raised positions, said leveling means including limiting arms and positioning arms for limiting movement of said raising and lowering means, and said raising and lowering means including bell cranks for carrying said wheels, an anchor beam for each limiting arm, and a swinging bracing link pivoted to each anchor beam and its limiting arm and to the respective bell crank, whereby to control the relative position of the respective wheel.

3. In an earthworking implement, the combination of: a pair of transversely spaced ground wheels; a pair of wheel frames in which said ground wheels are respectively mounted; a transverse beam upon which both of said frames are mounted; means for raising and lowering said frames and beam with respect to said wheels; a plurality of earthworking tools also mounted upon said beam; a draft tongue pivotally connected with the forward ends of said wheel frames; and leveling means attached to said raising and lowering means and to said draft tongue for automatically maintaining said frames level in both lowered and raised positions, said leveling means including limiting arms and positioning arms for limiting movement of said raising and lowering means, and said raising and lowering means including bell cranks for carrying said wheels, an anchor beam for each limiting arm, and a swinging bracing link pivoted to each anchor beam and to its limiting arm and to the respective bell crank, whereby to control the relative position of the respective wheel.

4. A combination as in claim 3 including means adjustably mounting said wheel frames on said transverse beam, and means adjustably mounting said earthworking tools on said transverse beam.

5. A combination as in claim 3 including a forward beam disposed transversely ahead of said transverse beam and upon which forward portions of said wheel frames are mounted, the rearward portion of said draft tongue being connected to said forward transverse beam.

LOYD E. HECKATHORN.

References Cited in the file of this patent

UNITED STATES PATENTS

| Number | Name | Date |
|---|---|---|
| 1,491,579 | Boda | Apr. 22, 1924 |
| 1,653,677 | Strandlund | Dec. 27, 1927 |
| 1,653,678 | Strandlund | Dec. 27, 1927 |
| 1,653,695 | Brown | Dec. 27, 1927 |
| 1,677,474 | Graham | July 17, 1928 |
| 2,050,731 | Phillips | Aug. 11, 1936 |
| 2,160,243 | Webb | May 30, 1939 |
| 2,257,650 | Pfeifer et al. | Sept. 30, 1941 |
| 2,320,742 | Newkirk | June 1, 1943 |
| 2,340,497 | Thomas | Feb. 1, 1944 |
| 2,385,950 | Silver | Oct. 2, 1945 |
| 2,426,529 | Silver | Aug. 26, 1947 |

FOREIGN PATENTS

| Number | Country | Date |
|---|---|---|
| 344,298 | Italy | Nov. 3, 1936 |